United States Patent [19]

Runkle et al.

[11] Patent Number: 4,563,924
[45] Date of Patent: Jan. 14, 1986

[54] METHOD AND APPARATUS FOR INCREASING WEAR LIFE OF CERAMIC TOOLS

[75] Inventors: Franklin D. Runkle, Novi; Gerald J. Tennenhouse, Southfield, both of Mich.

[73] Assignee: Ford Motor Company, Dearborn, Mich.

[21] Appl. No.: 584,433

[22] PCT Filed: Dec. 22, 1983

[86] PCT No.: PCT/US83/02028

§ 371 Date: Dec. 22, 1983

§ 102(e) Date: Dec. 22, 1983

[87] PCT Pub. No.: WO85/02798

PCT Pub. Date: Jul. 4, 1985

[51] Int. Cl.$^4$ .................... B23B 1/00; B23Q 11/00
[52] U.S. Cl. ...................... 82/1 C; 82/34 R;
29/DIG. 63; 29/DIG. 87; 29/DIG. 93;
239/291; 239/296; 239/558; 407/11; 408/56;
408/61
[58] Field of Search ............... 407/11; 82/1 C, 34 R;
239/558, 290, 291, 296; 408/56–61; 29/DIG.
50, DIG. 54, DIG. 63, DIG. 64, DIG. 65,
DIG. 66, DIG. 69, DIG. 70, DIG. 71, DIG.
87, DIG. 92, DIG. 93

[56] References Cited

U.S. PATENT DOCUMENTS

| 2,716,914 | 9/1955 | Pigott | 29/DIG. 63 |
| 3,526,362 | 9/1970 | Jackson | 239/290 |
| 3,773,262 | 11/1973 | Sparling | 239/291 |
| 3,990,332 | 11/1976 | Flom et al. | 82/1 C |
| 4,179,486 | 12/1979 | Lange | 264/65 |

OTHER PUBLICATIONS

American Machinist, May 24, 1954, pp. 155–159, "Machining Titanium with Coolants".

Primary Examiner—Leonidas Vlachos
Assistant Examiner—Jerry Kearns
Attorney, Agent, or Firm—Joseph W. Malleck; Roger L. May

[57] ABSTRACT

An apparatus and method are disclosed for reducing the oxygen concentration at the interface between a cutting tool and a relatively rotating metal workpiece. The apparatus comprises (a) a supporting means for holding the cutting tool in a predetermined position relative to the workpiece, and (b) means effective to direct a plurality of discrete flows of inert gas between the cutting tool and workpiece in a manner to substantially reduce the oxygen concentration in the zone to a predetermined level. The method comprises (a) directing a first stream of inert gas closely adjacent the interface, and (b) directing a second stream of inert gas to at least partially surround the first stream.

7 Claims, 5 Drawing Figures

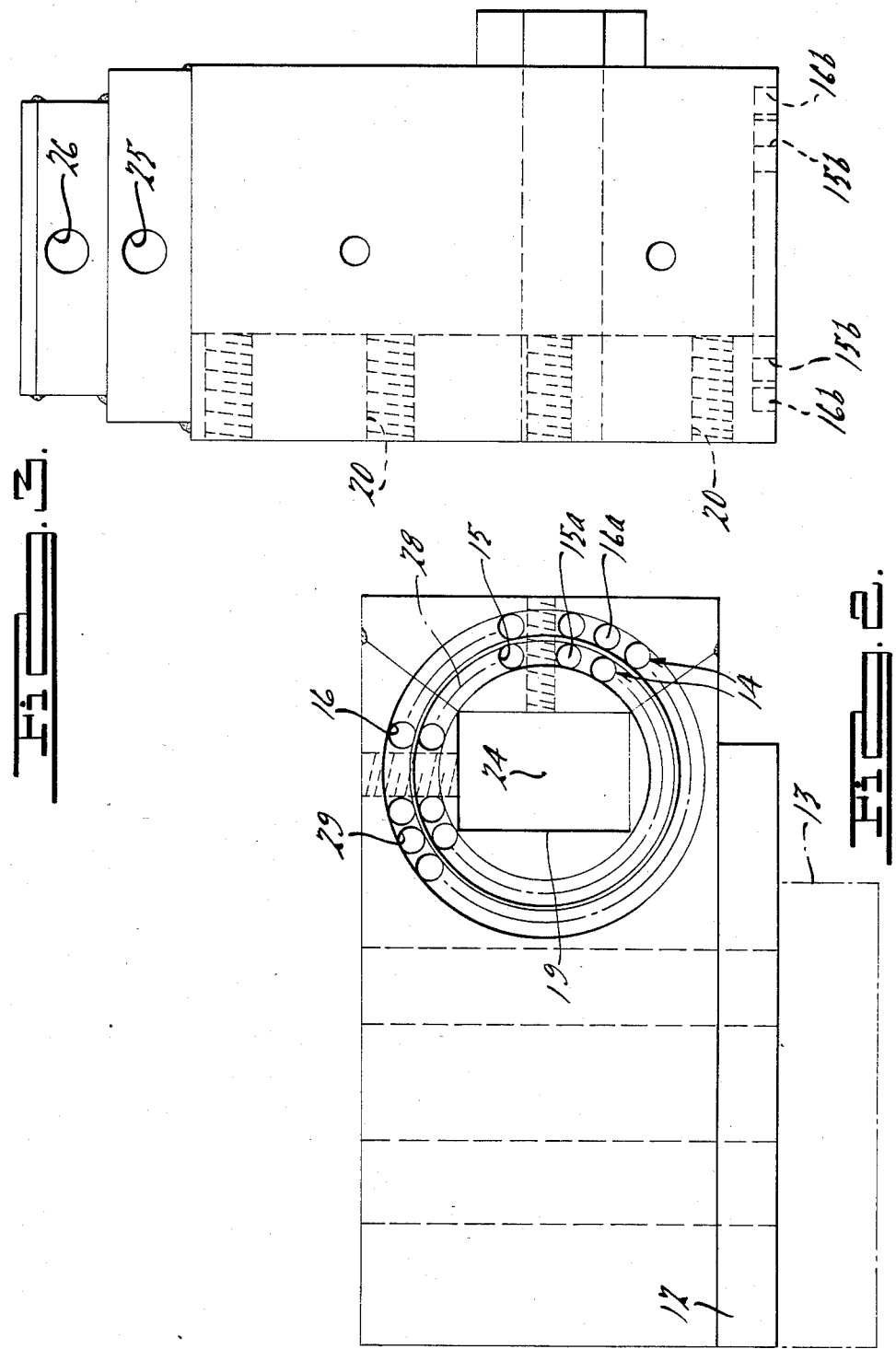

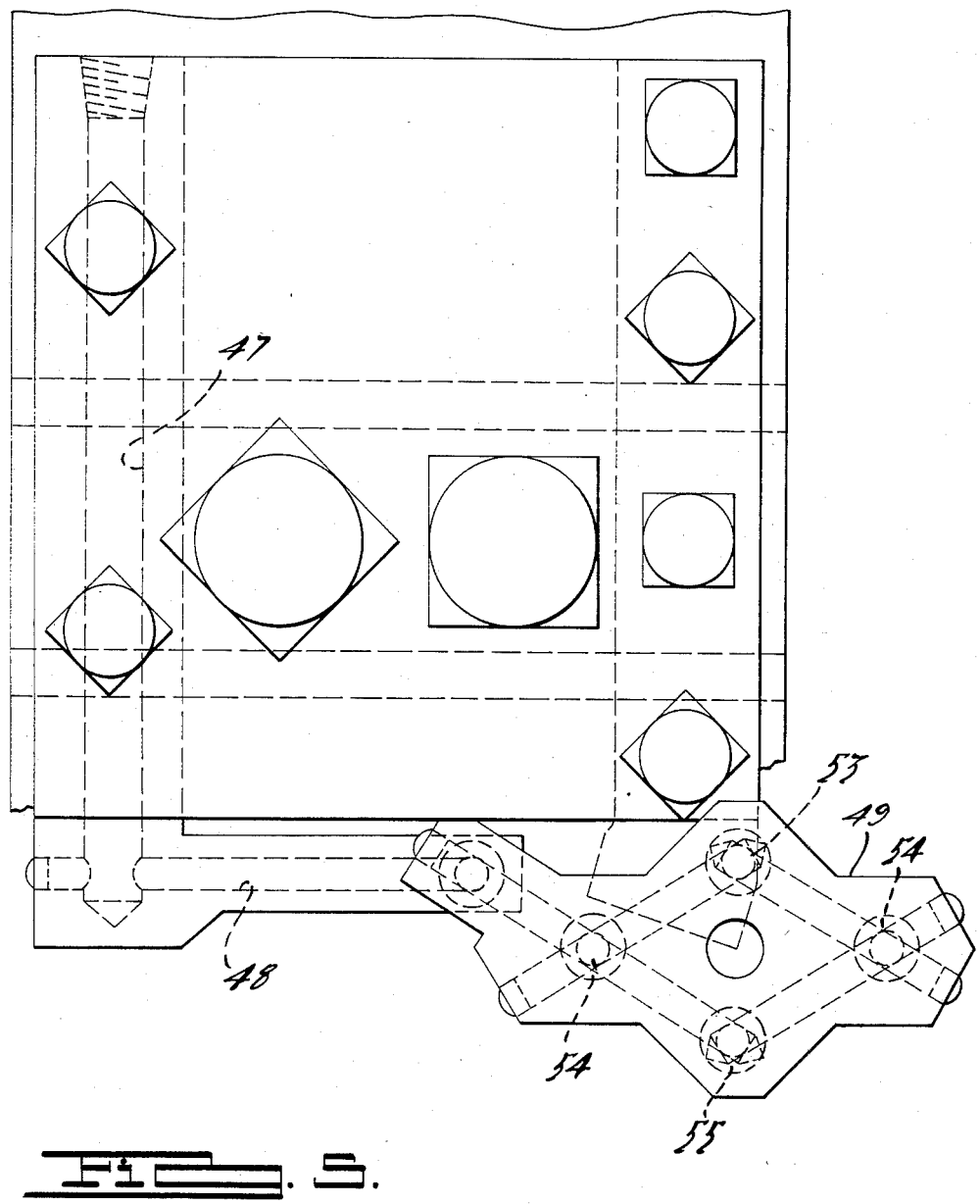

METHOD AND APPARATUS FOR INCREASING WEAR LIFE OF CERAMIC TOOLS

TECHNICAL FIELD

This invention relates to the technology of using ceramic cutting tools and control of conditions surrounding the use. This application is related to copending U.S. application Ser. No. 522,571, filed May 20, 1983, and assigned to the assignee of this invention.

BACKGROUND OF THE INVENTION AND PRIOR ART STATEMENT

As demonstrated in U.S. patent application Ser. No. 522,571, assigned to the assignee of this invention, the wear life of a substantially dense nonoxide ceramic, which is movingly interfaced at high temperatures or speed with a metal (of the type that forms a compound containing a metal oxide under the temperature conditions prevailing at the interface with the ceramic member), can be substantially improved by removing oxygen from between the ceramic member and the metal during such interfacing. In the referenced patent application, it was stated that a stream of inert gas, preferably nitrogen, should be directed at the cutting interface to reduce the presence of oxygen there, by at least 60% and optimally 100%. However, the ability to exclude oxygen at the higher percentages in this range is not easily obtained. If the flow of inert gas is from a source such as a nozzle, and is relatively slow so as not to consume a high quantity of the inert gas during the period of cutting, the rotation of the workpiece being cut sets up a boundary layer wind which blows the inert gas away from the workpiece surface, allowing oxygen or air to reach the workpiece in undesirable amounts. If the flow of inert gas is increased in intensity, such as by use of a needle-like jet, the suction created behind the high speed gas jet brings in oxygen or air, again exposing the workpiece to undesirable quantities of oxygen or air.

What is needed is an apparatus and method by which an inert atmosphere may be flowed into place at the interface of a cutting tool and rotating workpiece without eventual substantial displacement by air or an oxygen bearing gas.

SUMMARY OF THE INVENTION

The invention is an apparatus and method for reducing oxygen concentration at the interface between a cutting tool and a relatively rotating metal workpiece. The invention comprises a supporting means for holding the cutting tool in a predetermined position relative to the workpiece, and means positioned adjacent the interface for displacing the ambient atmosphere in the zone. The flow means is advantageously made effective to direct a plurality of discrete flows of inert gas between the cutting tool and workpiece in a manner to substantially reduce the oxygen concentration in the zone to a predetermined level, preferably by displacing the ambient atmosphere in the zone by at least 90%. The oxygen concentration the zone can be 5% or less when employing a plurality of streams or flows of inert gas, a first of which streams is directed closely adjacent the interface and at least a second of the streams is directed to partially surround the first stream.

In one embodiment, the streams of inert gas are directed by nozzles, at least certain ones of the nozzles having an axis substantially tangent to the contact of the tool with the workpiece, the other nozzles having axes parallel to said certain nozzles, and said nozzles each having an axis normal to a radius of the workpiece passing through said contact.

In another embodiment, the oxygen concentration in the zone may be reduced to a further level, at or below 1%, by employing flows of inert gas which are arranged in two concentric rings, the axes of said rings being coincident with a radius of said workpiece passing through said cutting tool contact. Preferably, the inert gas flow through the outer of said two rings has a lower flow rate than the inert gas passing through the innermost of said concentric rings. Advantageously, a low flow rate is characterized as being about one liter per minute and a fast flow rate is characterized as at least 10 liters per minute.

SUMMARY OF THE DRAWINGS

FIG. 2 is a bottom view of the structure of FIG. 1 taken along line 2—2 of FIG. 1;

FIG. 3 is a side view of the structure of FIG. 2 taken along line 3—3 of FIG. 2;

FIG. 5 is a side view of the structure of FIG. 4 taken along line 5—5 thereof.

BEST MODE FOR CARRYING OUT THE INVENTION

A primary object of this invention is to substantially and controllably reduce the oxygen concentration of the atmosphere in a zone surrounding the tool tip/workpiece interface during machine cutting, thereby reducing substantially the wear of the nonoxide ceramic cutting tool. This invention comprises provision of an improved apparatus that presents a flowing mass of inert gas that displaces the ambient atmosphere in such zone and about such interface to a controllable degree. Secondarily, it is preferred that the same or an additional mass of inert gas be used to separate or seal off the zone about such interface from additional intrusion of ambient atmosphere. To carry out such function or functions, a plurality of discrete flows of inert gas are synchronously directed into or about the zone at flow rates that inhibit the reentrance of displaced atmosphere.

Figure 1:
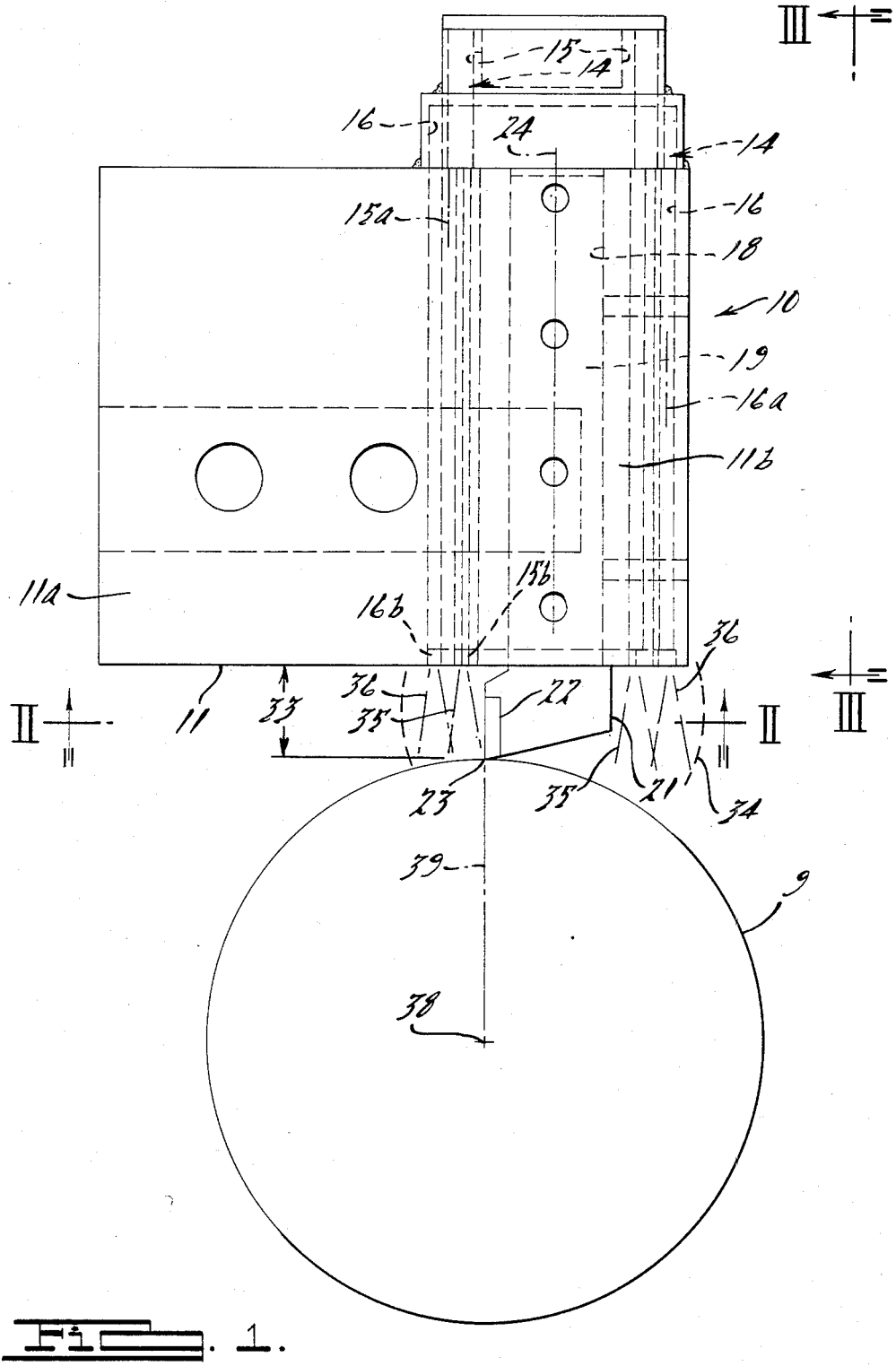
FIG. 1 is an elevational view of a mounting assembly for a cutting tool used to machine a cylindrical workpiece, the assembly embodying the principles of this invention.

For purposes of the best mode, the apparatus provides for a plurality of discrete flows of inert gas arranged in concentric curtains, each of the curtains surround the cutting interface, and the outermost curtain has a slower flow rate than the radially innermost curtain. As shown in FIGS. 1-3, a cutting tool supporting assembly 10 (sometimes referred to as supporting means) is constructed having a post 11 with a rectangular body. One portion 11a of the body has a boss 12 through which fasteners (not shown) extend for locking the post 11 to a machining head assembly 13. The other portion 11b has an opening 18 for receiving an elongated tool mounting member 19 which is secured in place by a plurality of set screws in passages 20. The mounting member 19 is effective to carry a smaller configured holding member 21, which in turn has elements securing a triangulated cutting tool 22. The supporting means is effective to secure and adjustably hold the cutting tool in a predetermined position relative to the workpiece.

Flow means 14 is used to direct a flowing mass of inert gas to displace the ambient atmosphere in the zone 34 by at least 90%. The flow means directs a plurality of discrete flows 35 of inert gas into the zone, which flows cooperate in carrying out displacement of the ambient atmosphere by forming concentric curtains. The curtains of gas of flow means 14 are formed by annularly arranged channels 15 and 16 extending through the post 11 and encircling an axis 24 which extends through or adjacent to the point of contact 23 (interface) between the cutting tool 22 and workpiece 9. The channels have their axes 15a and 16a respectively spaced equally apart along their annulus so that the flows of gas eminating from the channels merge together to define annular curtains about the interface 23. Here, there are two concentric curtains formed: an innermost curtain 35 by the series of channels 15, and an outermost curtain 36 by the series of channels 16.

In this embodiment, the channels each are defined as cylindrical borings having a diameter of about 0.187 inches and a length of about 5–7 inches. The axes of these borings are arranged in rings 28 and 29 (see FIG. 2), each having a center which is generally coincident with the axis 24. Ring 29 has a radius of about 1.28 inches and ring 28 has a radius of about 1.01 inches.

The channels have supply ports 25 and 26 at one end of the post 11, port 26 being for the ring 28 of channels and port 25 being for ring 29 of channels. The ports are separately connected to a suitable source of pressurized inert gas (such as nitrogen) with a controllable pressure. The other end (16b and 15b) of each of the channels defines a discharge nozzle. The distance 33 from the discharge nozzle to the interface is preferably about 1–2 inches.

The inner ring 28 of channels functions as the primary means to displace the ambient atmosphere in the zone 34 and is supplied with a gas pressure higher than the gas pressure used to supply the outer ring of channels 29 (the latter serving as a seal curtain 36 to exclude reentry of ambient atmosphere). The displacement of the ambient atmosphere by the inert gas should be by at least 90%.

The degree of ambient atmosphere displacement can be controlled, first, by analyzing the oxygen concentration in the zone after start-up of the flow means at a given rotational speed of the workpiece, and secondly, by adjusting one or both of the pressure of the gas feed to the inner ring 28 channels and the nozzle size of the channel to effect a flow rate that desirably changes the oxygen concentration. Since in most applications the nozzle size will be fixed, it is the flow pressure that is varied in a manner to obtain a 1–4 ft$^3$/min flow rate. The outer ring of channels is provided with a flow rate of 1–2 ft$^3$/min and the inner ring of channels with 3–4 ft$^3$/min.

With this embodiment, the oxygen concentration surrounding the interface in the zone 34 can be reduced to a level equal to less than 1% of ambient. It is advantageous if the common axis of the rings 28 and 29 is parallel to a radius 39 passing through the axis 38 of the workpiece and the point of contact 23 between the cutting tool and workpiece. This mode is particularly effective for workpieces rotating at speeds in excess of 1000 surface feet per minute (sfm).

Figure 4:
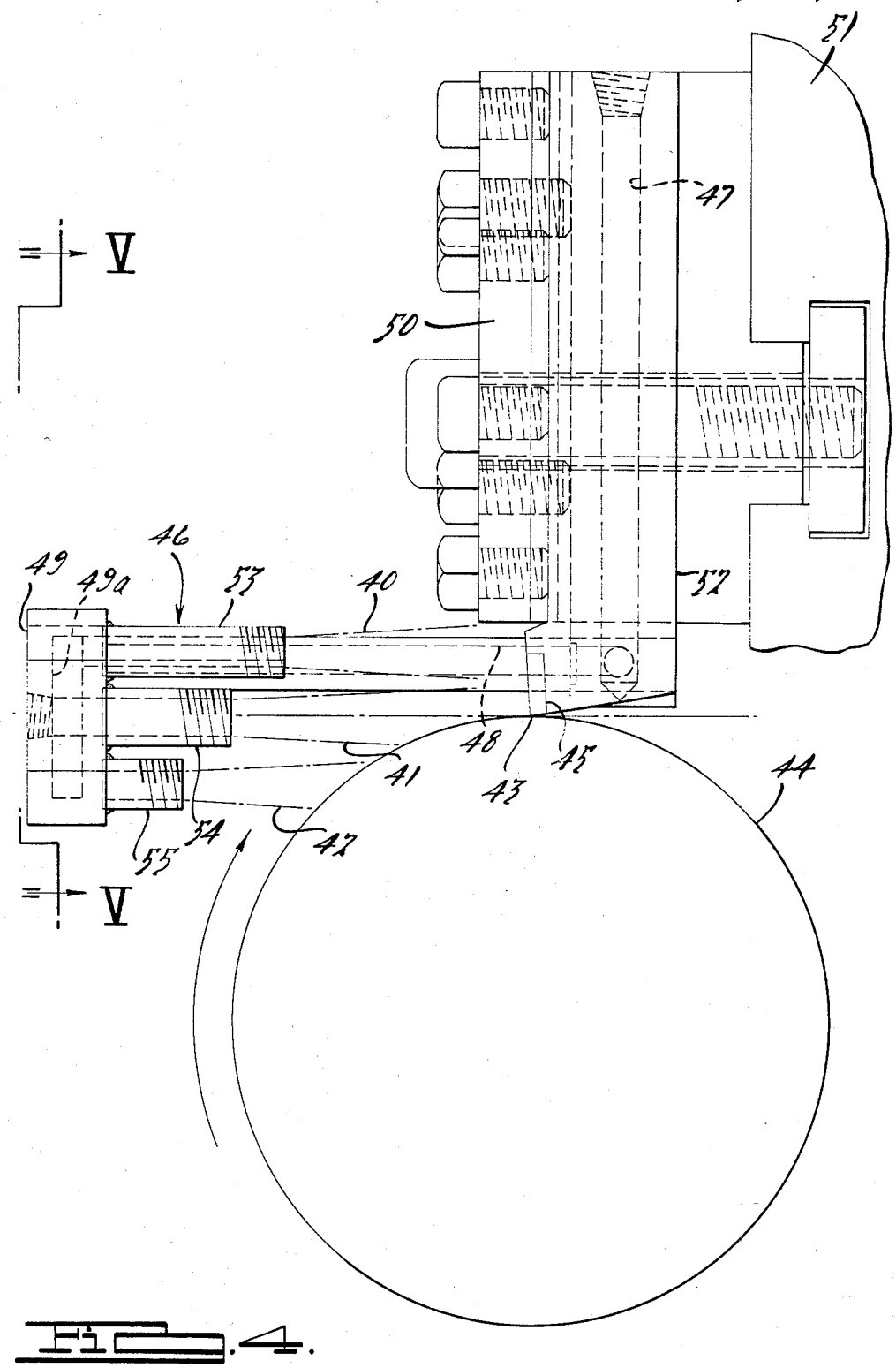
FIG. 4 is an elevational view of an alternative embodiment of a mounting assembly for a cutting tool in accordance with this invention.

Alternatively, the apparatus may be constructed as shown in FIGS. 4 and 5, wherein a plurality of discrete flows (40-41-42) of inert gas are directed in a direction tangentially to the point 43 of contact between the cutting tool 45 and the workpiece 44. This mode is simpler to adapt to present cutting machine assemblies currently in use, but is not able to achieve the higher degree of oxygen reduction as that of the preferred embodiment. The tool supporting assembly has post 50 attached to a machining head assembly 51. The post 50 has a subassembly 52 for carrying the tool 45. Flow means 46 has interconnected a vertical feed channel 47 (attached to the post 50), a horizontal channel 48, and a channel block 49. Nozzles or conduits 53, 54 and 55 are fluidly connected to the block 49 to present a cascade of the flows 40–42. It is desirable that the flow rate through nozzles 53–55 be higher than that used with the preferred embodiment, i.e., 4–5 ft$^3$/min and that the flow rate through nozzle 53 be higher than the flow rate through nozzles 54 and 55. The nozzles for defining flows 40-41-42 are respectively here preferably located a distance from the point of interface in the order of about 7.25 inches, about 8.34 inches, and about 9.5 inches. At least the nozzle 54 is directed substantially tangentially through the point of contact of said tool and workpiece. The other nozzles 53 and 55 are directed substantially parallel to the nozzle 54 in a manner to have inert gas engage the workpiece in a surrounding manner about the interface; flow 42 engages the workpiece in advance of the inert gas from the nozzle 54. The cascade of flows together operate to displace a major portion of the ambient atmosphere about the interface. However, due to the rotational movement of the workpiece, a portion of the ambient atmosphere can be carried as a boundary layer on the workpiece and sucked back to the interface in a manner that follows the vacuum created by the initial flows of inert gas. It has been determined by experimentation that oxygen concentration about the workpiece can be reduced to 3–5% by this mode.

We claim:

1. In an apparatus for reducing the oxygen concentration in a zone about the interface between a nonoxide ceramic cutting tool and a relatively rotating metal workpiece, the combination comprising:
   (a) supporting means for holding said cutting tool in a predetermined position relative to said workpiece; and
   (b) flow means positioned adjacent said interface and effective to displace the ambient atmosphere with an inert gas in said zone by at least 90%, said flow means comprising a source of inert gas, a fixture having gas conveying channels with a nozzle terminating each channel, a first of said nozzles being directed substantially tangentially through the point of contact of said tool and workpiece and the other of said nozzles being directed substantially parallel to said first nozzle in a manner to have inert gas engage the workpiece in a surrounding manner about the inert gas from said first nozzle, the flow of said inert gas being in the range of 1–5 ft$^3$/min, and the flow rate of the gas in the first nozzle exceeding the flow rate in the second nozzle by at least 1 ft$^3$/min.

2. In an apparatus for reducing the oxygen concentration in a zone about the interface between a nonoxide ceramic cutting tool and a relatively rotating metal workpiece, comprising:

(a) supporting means for holding said cutting tool in a predetermined position relative to said workpiece; and (b) flow means positioned adjacent said interface and effective to displace the ambient atmosphere with an inert gas in said zone by at least 90%, said flow means including a source of inert gas, means for directing a plurality of concentric curtains of said inert gas into the zone about the interface between the cutting tool and the relatively rotating metal workpiece, which curtains of inert gas displace the ambient atmosphere in said zone by at least 95%, said flow means producing a flow rate of inert gas in the innermost curtain that exceeds the flow rate of inert gas in the outermost curtain by at least 1 ft$^3$/min, the flow rate of the inert gas in the innermost curtain being in the range of 3-5 ft$^3$/min.

3. In an apparatus for reducing the oxygen concentration in a zone about the interface between a nonoxide ceramic cutting tool and a relatively rotating metal workpiece, comprising:

(a) supporting means for holding said cutting tool in a predetermined position relative to said workpiece; and (b) flow means positioned adjacent said interface and effective to displace the ambient atmosphere by means of a flow of inert gas into the zone, said flow means including a source of inert gas, a first plurality of nozzles producing a first annulus of said inert gas around the interface and a second plurality of nozzles producing a second annulus of said inert gas about the interface, the diameter of the second annulus being larger than the diameter of the first annulus by an amount that will cause the annular curtain of inert gas formed by the flow of the inert gas through said first plurality of nozzles and the annular curtain of inert gas formed by the second plurality of nozzles to merge in a position adjacent the interface, said flow means including means for producing a flow of inert gas in said first annulus at a rate larger than the rate of flow in said second annulus.

4. The apparatus of claim 3, in which the rate of flow in said first annulus exceeds the rate of flow in said second annulus by at least 1 ft$^3$/min.

5. The apparatus of claim 3, in which the difference in the rates of flow in said first and said second annulus is in the range of 1-2 ft$^3$/min and the rate of flow in said first annulus is in the range of 3-4 ft$^3$/min.

6. The apparatus of claim 3, in which the rates of flow of inert gas in said first annulus and said second annulus are sufficient and sufficiently different to displace at least 95% of the ambient atmosphere in the zone about the interface of the cutting tool and the workpiece.

7. A method of reducing the oxygen concentration in a zone about the interface between a nonoxide ceramic cutting tool and a relatively rotating metal workpiece, comprising:

(a) directing first streams of inert gas to substantially and closely surround the point of contact of said tool with said workpiece; and (b) directing second streams of inert gas to at least partially surround said first stream, said first streams of inert gas forming a first annular curtain surrounding said interface and said second streams of inert gas forming a second annular curtain at least partially surrounding said first curtain of inert gas, the rates of flow of inert gas in said first curtain exceeding the rates of flow of inert gas in said second curtain by at least 1 ft$^3$/min, said curtains of inert gas being directed in a manner to displace the ambient atmosphere in said zone to a level in which the oxygen concentration therein is equal to or less than 1% of the gas in the zone.

* * * * *